United States Patent
Lanni

(10) Patent No.: US 9,601,922 B2
(45) Date of Patent: Mar. 21, 2017

(54) POWER SUPPLY EQUIPMENT UTILIZING INTERCHANGEABLE TIPS TO PROVIDE POWER AND A DATA SIGNAL TO ELECTRONIC DEVICES

(71) Applicant: Thomas W. Lanni, Laguna Niguel, CA (US)

(72) Inventor: Thomas W. Lanni, Laguna Niguel, CA (US)

(73) Assignee: COMARCO WIRELESS TECHNOLOGIES, INC., Lake Forest, CA (US)

( * ) Notice: Subject to any disclaimer, the term of this patent is extended or adjusted under 35 U.S.C. 154(b) by 0 days.

(21) Appl. No.: 14/736,885

(22) Filed: Jun. 11, 2015

(65) Prior Publication Data

US 2015/0277455 A1  Oct. 1, 2015

Related U.S. Application Data

(60) Division of application No. 13/461,149, filed on May 1, 2012, now Pat. No. 9,153,960, which is a
(Continued)

(51) Int. Cl.
*G05F 3/06* (2006.01)
*H02J 1/00* (2006.01)
(Continued)

(52) U.S. Cl.
CPC ................ *H02J 1/00* (2013.01); *G05F 1/00* (2013.01); *H01R 31/065* (2013.01); *H02J 4/00* (2013.01);
(Continued)

(58) Field of Classification Search
CPC .......... H02J 1/00; H02J 7/0029; H02J 7/0055; G05F 1/00; H01R 31/065; H01R 29/00
See application file for complete search history.

(56) References Cited

U.S. PATENT DOCUMENTS

| 5,164,652 A | 11/1992 | Johnson et al. |
| 5,254,931 A | 10/1993 | Martensson |

(Continued)

FOREIGN PATENT DOCUMENTS

| EP | 1 487 081 A2 | 12/2004 |
| WO | 9819223 A1 | 5/1998 |
| WO | 2006116298 A1 | 11/2006 |

OTHER PUBLICATIONS

American Power Conversion, "APC Universal Notebook Battery (UPB60) User's Manual", pp. 1-2, American Power Conversion, 2005.

(Continued)

*Primary Examiner* — Daniel Cavallari
(74) *Attorney, Agent, or Firm* — Graham Curtin, P.A.

(57) ABSTRACT

Power supply equipment includes an adapter which converts power from a power source to DC power for powering an electronic device. The power supply equipment includes circuitry which produces a data signal for use by the electronic device to control power drawn by the electronic device. A cable, extends from the adapter. The power supply equipment further includes a tip which has an input side and an output side. The input side of the tip is detachable mateable to the cable. The output side of the tip is detachably mateable to the electronic device. The tip output side has a shape and size dependent on the shape and size of a power input opening of the electronic device. The tip provides the data signal, as well as the DC power, to the electronic device. Different tips may be used to provide appropriate data signals to different electronic devices.

3 Claims, 10 Drawing Sheets

Related U.S. Application Data continuation-in-part of application No. 13/209,636, filed on Aug. 15, 2011, now Pat. No. 8,330,303, which is a continuation of application No. 12/840,952, filed on Jul. 21, 2010, now Pat. No. 7,999,412, which is a continuation-in-part of application No. 11/604,950, filed on Nov. 28, 2006, now Pat. No. 7,868,486, which is a continuation-in-part of application No. 10/758,933, filed on Jan. 15, 2004, now Pat. No. 7,453,171.

(51) Int. Cl.
| | |
|---|---|
| *G05F 1/00* | (2006.01) |
| *H01R 31/06* | (2006.01) |
| *H02J 4/00* | (2006.01) |
| *H02J 7/00* | (2006.01) |
| *H01R 29/00* | (2006.01) |

(52) U.S. Cl.
CPC .......... *H02J 7/0029* (2013.01); *H02J 7/0055* (2013.01); *H01R 29/00* (2013.01)

(56) References Cited

U.S. PATENT DOCUMENTS

| | | |
|---|---|---|
| 5,333,177 A | 7/1994 | Braitberg |
| 5,350,993 A | 9/1994 | Toya et al. |
| 5,369,352 A | 11/1994 | Toepfer et al. |
| 5,420,496 A | 5/1995 | Ishikawa |
| 5,506,490 A | 4/1996 | DeMuro |
| 5,534,765 A | 7/1996 | Kreisinger et al. |
| 5,570,002 A | 10/1996 | Castleman |
| 5,573,425 A | 11/1996 | Morisawa et al. |
| 5,593,323 A | 1/1997 | Dernehl |
| 5,615,344 A | 3/1997 | Corder |
| 5,648,711 A | 7/1997 | Hakkarainen |
| 5,649,001 A | 7/1997 | Thomas et al. |
| 5,694,024 A | 12/1997 | Dias et al. |
| 5,703,467 A | 12/1997 | Patino |
| 5,783,926 A | 7/1998 | Moon et al. |
| 5,836,783 A | 11/1998 | Morisawa et al. |
| 5,861,729 A | 1/1999 | Maeda et al. |
| 5,912,544 A | 6/1999 | Miyakawa et al. |
| 5,939,856 A | 8/1999 | Demuro et al. |
| 5,955,797 A | 9/1999 | Kim |
| 5,969,438 A | 10/1999 | Odaohara |
| 6,054,846 A | 4/2000 | Castleman |
| 6,288,522 B1 | 9/2001 | Odaohhara et al. |
| 6,358,096 B1 | 3/2002 | Beckman |
| 6,360,177 B1 | 3/2002 | Curt et al. |
| 6,368,155 B1 | 4/2002 | Bassler |
| 6,429,622 B1 | 8/2002 | Svensson |
| 6,459,175 B1 | 10/2002 | Potega et al. |
| 6,528,970 B1 | 3/2003 | Liu et al. |
| 6,597,565 B1 | 7/2003 | Kluth et al. |
| 6,628,535 B1* | 9/2003 | Wu .............. G05F 1/56 363/146 |
| 6,751,109 B2 | 6/2004 | Doss |
| 6,795,302 B2 | 9/2004 | Kluth et al. |
| 6,903,950 B2 | 6/2005 | Afzal et al. |
| 6,934,561 B2 | 8/2005 | Burrus |
| 6,936,936 B2 | 8/2005 | Fischer et al. |
| 6,999,505 B2* | 2/2006 | Yokoo .............. H04B 3/54 340/12.37 |
| RE39,036 E | 3/2006 | Castleman |
| 7,028,202 B2 | 4/2006 | Long et al. |
| 7,039,821 B1 | 5/2006 | Potega |
| 7,058,484 B1 | 6/2006 | Potega |
| 7,127,623 B2* | 10/2006 | Potega .............. G06F 1/1632 713/300 |
| 7,145,312 B2 | 12/2006 | Lanni |
| 7,166,937 B2* | 1/2007 | Wilson .............. H02M 3/00 307/151 |
| 7,193,398 B2 | 3/2007 | Lanni |
| 7,243,246 B2 | 7/2007 | Allen et al. |
| 7,296,164 B2 | 11/2007 | Breen et al. |
| 7,318,744 B2 | 1/2008 | Kuo |
| 7,377,805 B2 | 5/2008 | Kim et al. |
| 7,392,099 B2 | 6/2008 | Atkinson et al. |
| 7,392,410 B2 | 6/2008 | Allen et al. |
| 7,453,171 B2 | 11/2008 | Lanni |
| 7,504,800 B2 | 3/2009 | Culbert et al. |
| 7,525,216 B2 | 4/2009 | Tupman et al. |
| 7,581,119 B2 | 8/2009 | Tupman et al. |
| 7,823,214 B2 | 10/2010 | Rubinstein et al. |
| 7,868,486 B2 | 1/2011 | Lanni |
| 7,937,603 B2 | 5/2011 | Haberle et al. |
| 7,999,412 B2 | 8/2011 | Lanni |
| 8,225,111 B2 | 7/2012 | Bailey et al. |
| 8,261,100 B2 | 9/2012 | Paniagua et al. |
| 8,330,303 B2 | 12/2012 | Lanni |
| 8,492,933 B2 | 7/2013 | Lanni |
| 2002/0171980 A1 | 11/2002 | Tsukihashi |
| 2003/0085621 A1 | 5/2003 | Potega |
| 2003/0207603 A1 | 11/2003 | Potega |
| 2003/0222503 A1* | 12/2003 | Lam .............. G06F 1/266 307/38 |
| 2004/0075419 A1 | 4/2004 | Massey et al. |
| 2005/0127758 A1* | 6/2005 | Atkinson .............. G06F 1/3203 307/80 |
| 2005/0162020 A1 | 7/2005 | Lanni |
| 2005/0240705 A1 | 10/2005 | Novotney et al. |
| 2006/0015757 A1 | 1/2006 | Tupman et al. |
| 2006/0152084 A1 | 7/2006 | Tupman et al. |
| 2006/0154530 A1 | 7/2006 | Novotney et al. |
| 2006/0164061 A1 | 7/2006 | Formenti et al. |
| 2006/0174126 A1 | 8/2006 | Crandall et al. |
| 2006/0220465 A1 | 10/2006 | Kingsmore, Jr. et al. |

OTHER PUBLICATIONS

Compaq Computer Corporation et al., "Univeral Serial Bus Specification (Revision 2.0)", pp. 1-650, Compaq Computer Corporation et al., Apr. 27, 2000.

Dallas Semiconductor Group, "DS2434 Battery Identification Chip", pp. 1-17, Dallas Semiconductor Group, 1995.

Electus Distribution, "Electus Distribution Reference Data Sheet: Power Adaptors or 'Plug Packs'", pp. 1-4, Electus Distribution, 2001.

Future Technology Devices International LTD., "TTL-232R-3V3 USB to TTL Serial Converter Cable", (3.3V IO) Datasheet Version 0.90, pp. 1-8, Future Technology Devices International Ltd., 2006.

Motorola, "Motomanual—Motorola Razr V3", pp. 1-254, English and Spanish version, Motorola, Inc., 2006.

Nokia Corporation, Nokia 2-mm DC Charging Interface Specification (Version 1.2), pp. 1-22, Nokia Corporation, Aug. 22, 2006.

Revolution Education Ltd., "AXE027 Picaxe USB Cable", pp. 1-4, Revolution Education Ltd., Jun. 6, 2006.

Valence Technology, Inc., "N-Charge power Center", pp. 1-2, Valence Technology, Inc., Feb. 2004.

Tupman et al., "Portable Power Source to Provide Power to an Electronic Device via an Interface", U.S. Appl. No. 11/031,547, filed Jan. 7, 2005.

Tupman et al., "Method and System for Discovering a Power Source on a Peripheral Bus", U.S. Appl. No. 11/031,288, filed Jan. 7, 2005.

Paniagua et al., "Power Supply Capable of Receiving Digital Communications from Electronic Devices", U.S. Appl. No. 11/513,687, filed Aug. 30, 2006.

Crandall et al., "Small Memory Footprint Fast Elliptic Encryption", U.S. Appl. No. 11/051,441, filed Feb. 3, 2005.

Jobs et al., "Media Management for Groups of Media Items", U.S. Appl. No. 60/642,334, filed Jan. 7, 2005.

Jobs et al., "Portable Media Device and Improved Playlist Processing on Media Devices", U.S. Appl. No. 60/642,276, filed Jan. 7, 2005.

Novotney et al., "Connector System", U.S. Appl. No. 11/031,301, filed Jan. 7, 2005.

(56) References Cited

OTHER PUBLICATIONS

Novotney et al., "Connector Interface System for a Multi-Communication Device", U.S. Appl. No. 10/833,689, filed Apr. 27, 2004.
European search report dated Sep. 28, 2006 for EP Patent Application No. EP05250133.5, 3 Pages.
European search report dated Feb. 6, 2009 for EP Patent Application No. EP07254497.6, 13 Pages.
European Patent Office, "Examination Report/Communication Pursuant to Article 94(3) EPC" re: Patent Application Serial No. 02 250 133.5, Date: Jun. 14, 2012, 11 pages.
National Semiconductor Corporation, "Datasheet for LM2601 Adapter Interface Circuit," dated Apr. 2001, 6 pages.
*ACCO Brands USA LLC* vs. *Comarco Wireless Technologies, Inc.*, Case No. C11-4378 RS, U.S. District Court for the Northern District of California, Plaintiff and Counterdefendant ACCO's Invalidity Contentions, pp. 1-3 and Exhibit E., pp. 1-6, Jun. 27, 2012.
Radio Shack 1990 Catalog, cover page and p. 151, 1990.
Radio Shack 1994 Catalog, cover page and p. 142, 1994.
Radio Shack 1995 Catalog, cover page and pp. 150-151, 1995.
Minwa Products, "MW182", Minwa Products Catalog 1993, 1 page.
Power Stream Technology, "High Quality Automobile to Laptop DC/DC Converter" Specification sheet copyright 2000, 2002, 2003, 2004—4 pages.
"Universal Serial Bus Specification Revision 2.0" Compaq Computer Corporation, et al., Apr. 27, 2000, Cover page, Copyright notice page, Content pp. v-xiii, Section 7.2 Power Distribution, pp. 171-178.
Case No. C11-4378-RS, Patent L.R. 4-3 Joint Claim Construction and Prehearing Statement, Pacer Document No. 33, Aug. 31, 2012, 26 pages.
Declaration of Thomas W. Lanni Regarding Comarco N19 and N24 Tips, May 14, 2013, 1 page.
Comarco Wireless Technologies, Inc. Specification Control Drawing No. 1910-0219, "Tip N19", May 14, 2004, 1 page.
Comarco Wireless Technologies, Inc. Specification Control Drawing No. 1245-0021-T, "EPROM DS2502, T0-92", Jun. 21, 2005, 1 page.
Comarco Wireless Technologies, Inc. Specification Control Drawing No. 1910-0224, "Tip N24", Oct. 23, 2004, 1 page.
Case No. C11-4378-RS, Comarco Wireless Technologies, Inc.'s Patent L.R. 4-5(a) Opening Claim Construction Brief, Pacer No. Documents 36, 36-1 and 36-2, Sep. 21, 2012, 44 pages.
Case No. C11-4378-RS, Plaintiff Acco Brands USA LLC's Opening Markman Brief, Pacer Document No. 38, Oct. 12, 2012, 31 pages.
Case No. C11-4378-RS, Comarco Wireless Technologies, Inc.'s Memorandum of Points and Authorities in Opposition to Plaintiff's Motion to Strike the Declaration of Thomas W. Lanni, Pacer Document No. 40, Oct. 26, 2012, 16 pages.
Case No. C11-4378-RS, Acco Brands USA LLC's Reply in Support of Motion to Strike the Declaration of Thomas W. Lanni, Pacer Document No. 41, Nov. 2, 2012, 15 pages.
Case No. C11-4378-RS, Comarco Wireless Technologies, Inc.'s Patent L.R. 4-5(c) Claim Construction Reply Brief, Pacer Document No. 42, Nov. 2, 2012, 18 pages.
Case No. C11-4378-RS, Claim Constuction Order, Pacer Document No. 49, Mar. 6, 2013, 23 pages.

* cited by examiner

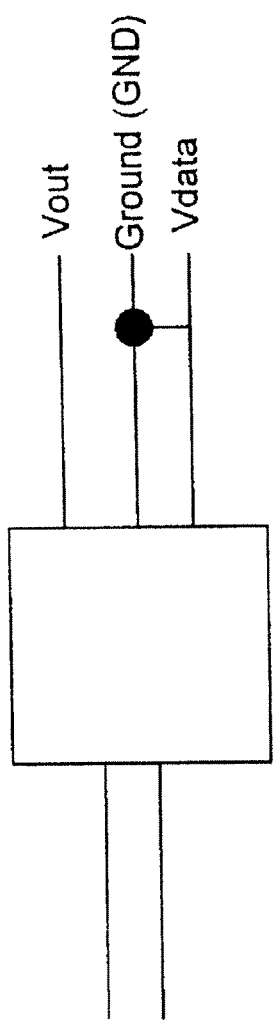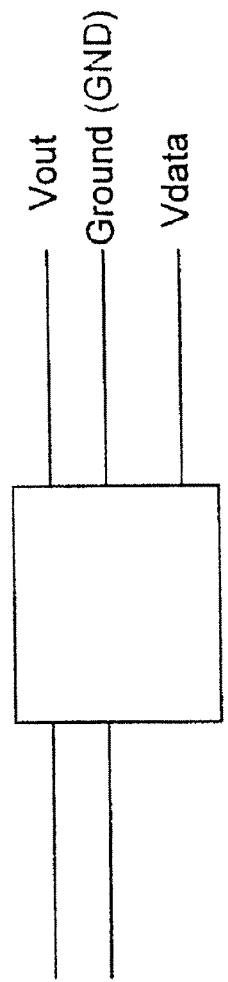

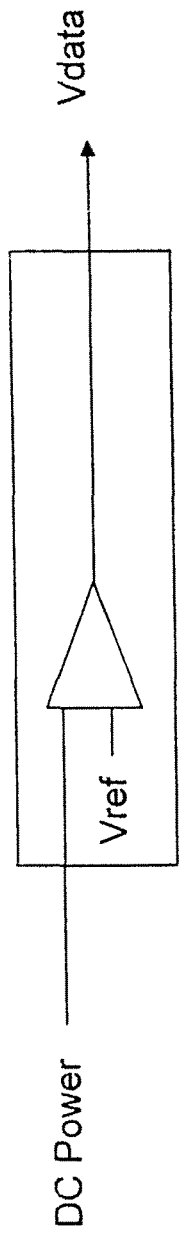
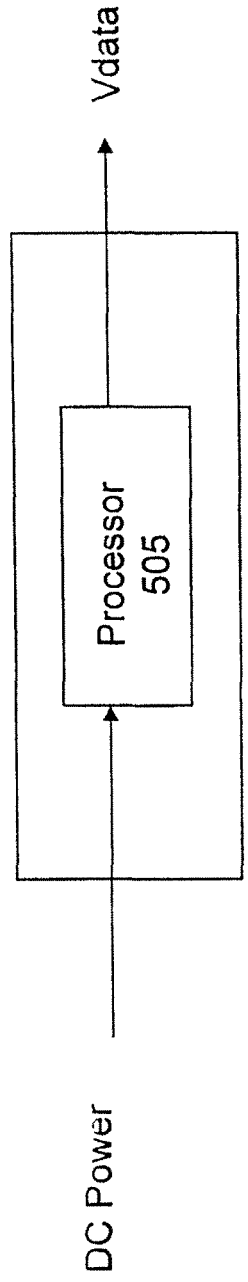

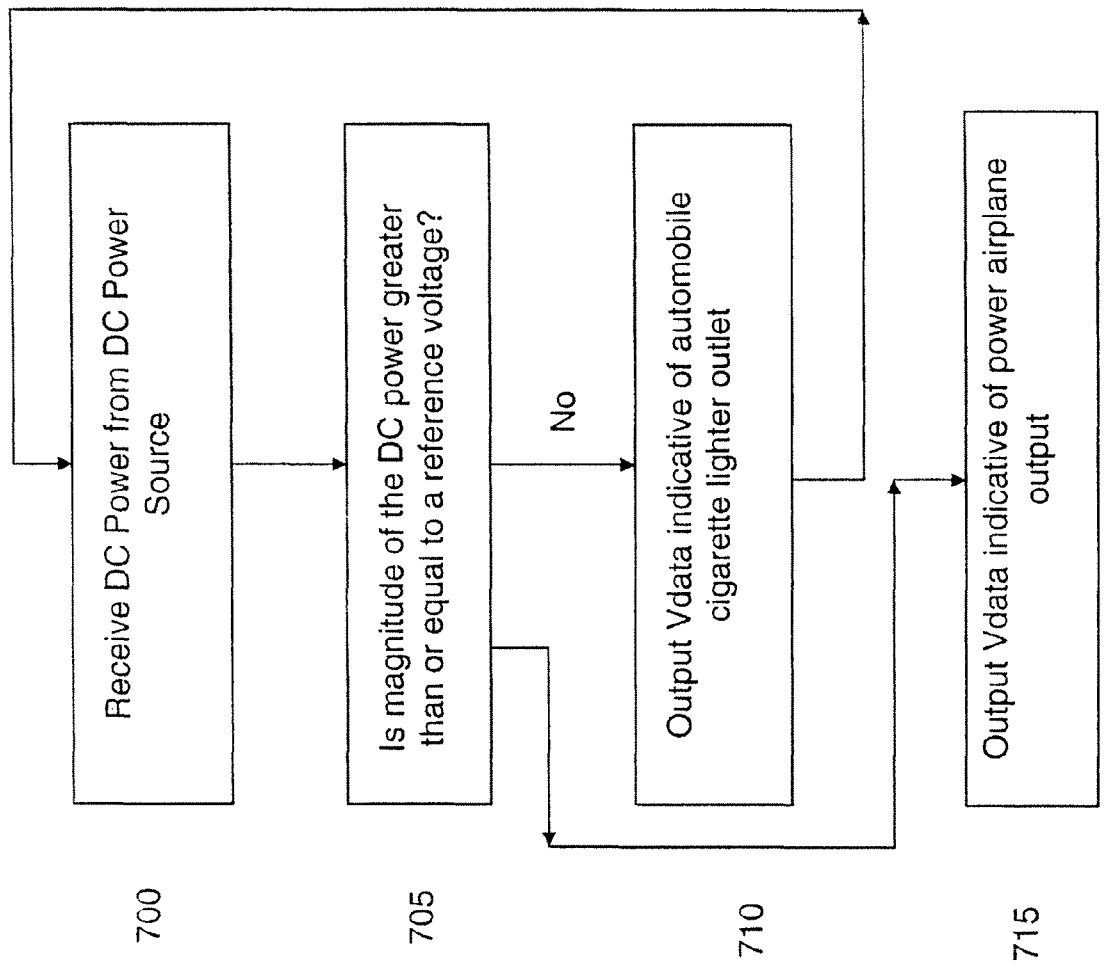

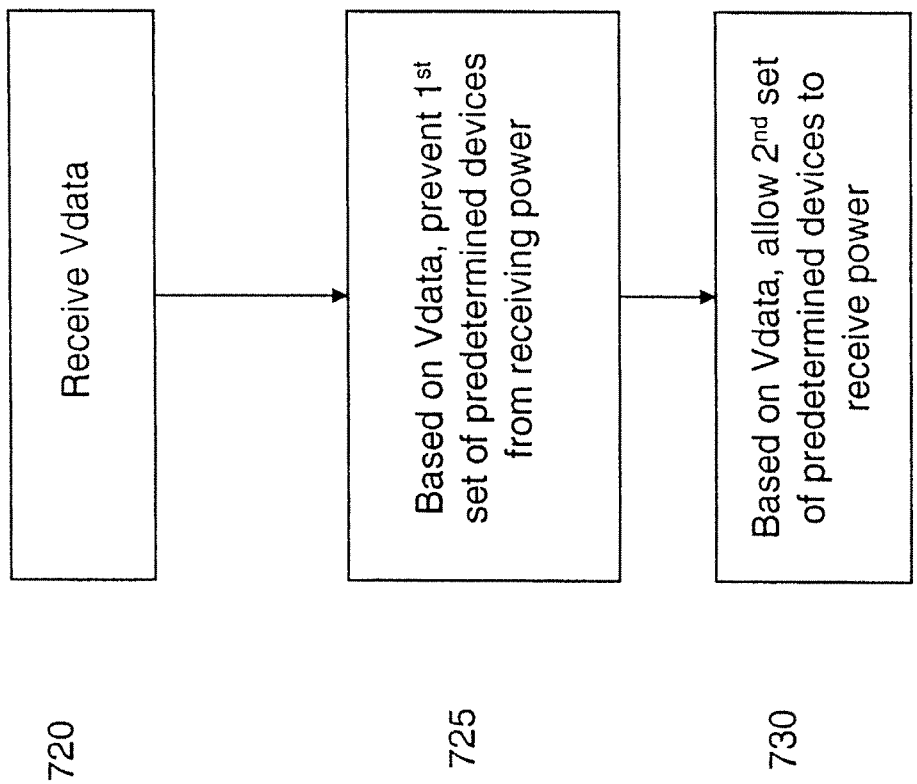

POWER SUPPLY EQUIPMENT UTILIZING INTERCHANGEABLE TIPS TO PROVIDE POWER AND A DATA SIGNAL TO ELECTRONIC DEVICES

RELATED APPLICATIONS

This application is a divisional of co-pending application Ser. No. 13/461,149, filed on May 1, 2012; which is a continuation-in-part of application Ser. No. 13/209,636, filed on Aug. 15, 2011, now U.S. Pat. No. 8,330,303, issued on Dec. 11, 2012; which is a continuation of application Ser. No. 12/840,952, filed on Jul. 21, 2010, now U.S. Pat. No. 7,999,412 issued on Aug. 16, 2011; which is a continuation of application Ser. No. 11/604,950, filed on Nov. 28, 2006, now U.S. Pat. No. 7,868,486 issued on Jan. 11, 2011; which is a continuation-in-part of application Ser. No. 10/758,933, filed on Jan. 15, 2004, now U.S. Pat. No. 7,453,171 issued on Nov. 18, 2008. Each of the preceding patents and applications is herein incorporated by reference in its entirety.

BACKGROUND OF THE INVENTION

1. Technical Field

This invention relates to DC power adapters for powering electronic devices.

2. Description of the Related Arts

There are power systems in the art which allow a user to hook up a DC/DC adapter to an automobile outlet, to supply regulated DC power to power an electronic device, such as a notebook computer. Automobile outlets typically provide a DC voltage in a range between 11.0 and 14.1 Volts. Some power systems also allow the user to hook up the DC/DC adapter to an airplane output such as the EMPOWER system. EMPOWER typically provides a DC voltage in a range between 14.5 and 15.5 Volts.

Accordingly, some DC/DC adapters can be used with both an automobile outlet and the EMPOWER system to provide a regulated DC power to the electronic device such as the notebook computer. Notebook computers often contain lithium ion batteries. Such batteries can be recharged when the notebook computer is hooked up to the DC/DC adapter. For example, if the user is in a car, the user can couple a DC/DC adapter to the notebook computer and to the cigarette lighter outlet to power the notebook computer. The batteries in the notebook computer will draw some of the DC power supplied to recharge the batteries of the notebook computer if they are low in power. Accordingly, the user can simultaneously use the notebook computer and recharge the batteries therein.

The user can also use the DC/DC adapter while on an airplane, by plugging the DC/DC adapter into the EMPOWER outlet. The EMPOWER outlet and the automobile outlets have different sizes and shapes. Accordingly, the user can directly plug the DC/DC adapter into the EMPOWER outlet, and can place a connector over the EMPOWER plug of the DC/DC adapter and then plug the connector into the automobile cigarette lighter outlet. When the user hooks the DC/DC adapter up to the EMPOWER outlet and then to the electronic device, the electronic device receives the regulated DC power. However, if the charging circuitry in the battery malfunctions, the battery can overheat or even catch on fire when recharging from an EMPOWER DC source. If the battery were to catch on fire while an airplane in which the emPlower outlet is located is flying, the fire would have the potential to cause the airplane to crash or cause substantial damage.

To address this problem, one system in the art provides a connector to connect between the DC/DC adapter and the notebook computer to inform the notebook computer not to recharge the batteries. FIG. 1 illustrates a power supply system according to the prior art. As shown, a DC power source 100 is coupled to a DC/DC adapter 105 via a cable 102. The DC/DC adapter 105 receives power from the DC power source 100 and outputs regulated DC power to an electronic device 120, via a cable 110 and a connector 115 coupled to the end of the cable 110.

The DC/DC adapter 105 can provide three output pins to the electronic device 120, as shown in FIGS. 2A and 2B of the prior art. The first pin can provide the output voltage (i.e., Vout), the second pin can provide a ground reference (i.e., GND), and the third pin can provide a data line (i.e., Vdata) to instruct the notebook as to whether the batteries should be recharged or not. For example, as shown in FIG. 2A, Vdata could be tied to GND to indicate that the DC power source 100 is the EMPOWER system and therefore the battery should not be recharged. Alternatively, as shown in FIG. 2B, Vdata could also be left open (i.e., to provide a non-grounded floating voltage) when the DC power source 100 is in a cigarette lighter outlet of an automobile. Accordingly, when using the DC/DC adapter 105 while in an automobile, the user would use a connector 115 having the Vdata line floating, and when using the DC/DC adapter 105 with the EMPOWER system of an airplane, the user would use a connector 115 having the Vdata line tied to GND.

However, problems arise when the user forgets to change the connector 115 for use with the automobile when the user is in an airplane. Accordingly, if the user has the wrong connector 115 attached when using with the EMPOWER system, a battery of an electronic device 120 such as a notebook computer can charge the battery even when used with the EMPOWER system, and if the charging circuitry of the battery malfunctions, overheating or even a fire can occur, resulting in damage to the notebook computer. Also, if the connector 115 is damaged or flawed, then it may not provide the correct Vdata signal to the notebook computer, allowing the notebook computer to recharge the batteries in an airplane when they shouldn't be allowed to do so.

Accordingly, current DC/DC power adapter systems are deficient because they are incapable of automatically and intelligently informing an electronic device 120 coupled thereto of the DC power source (i.e., the EMPOWER system or an automobile cigarette lighter outlet).

BRIEF DESCRIPTION OF THE DRAWINGS

FIG. 2A illustrates a first connector to coupled a power supply system to an electronic device according to the prior art;

FIG. 2B illustrates a second connector to coupled a power supply system to an electronic device according to the prior art;

FIG. 5A illustrates comparison circuitry according to an embodiment of the invention;

FIG. 5B illustrates comparison circuitry according to an additional embodiment of the invention;

FIG. 7A illustrates a method of determining and outputting Vdata according to an embodiment of the invention;

FIG. 7B illustrates a method of receiving Vdata and allowing power to flow to devices within the electronic device based on Vdata according to an embodiment of the invention.

DETAILED DESCRIPTION

An embodiment of the present invention is directed to a power supply system to determine a DC power source (e.g., an automobile cigarette lighter outlet or an EMPOWER airplane outlet) coupled thereto and send a signal indicative of the power source to an electronic device coupled thereto. The electronic device may be a notebook computer or other portable consumer electronic device, for example. Based on the signal sent to the electronic device, the electronic device may control the amount of power drawn to prevent overheating. For example, when a notebook computer is hooked up and the power source is the EMPOWER system, the electronic device may disable charging of the internal batteries of the notebook computer, in order to prevent damage or overheating of the batteries due to malfunction or failure. The DC power source may be determined by voltage comparison circuitry, such as a comparator, or by a voltage comparison device including a processor.

Figure 1:
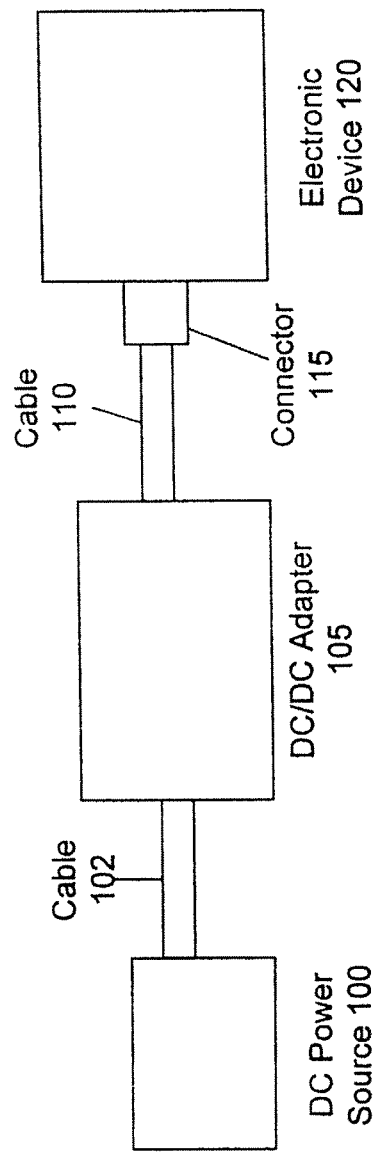
FIG. 1 illustrates a power supply system according to the prior art.
Figure 3:
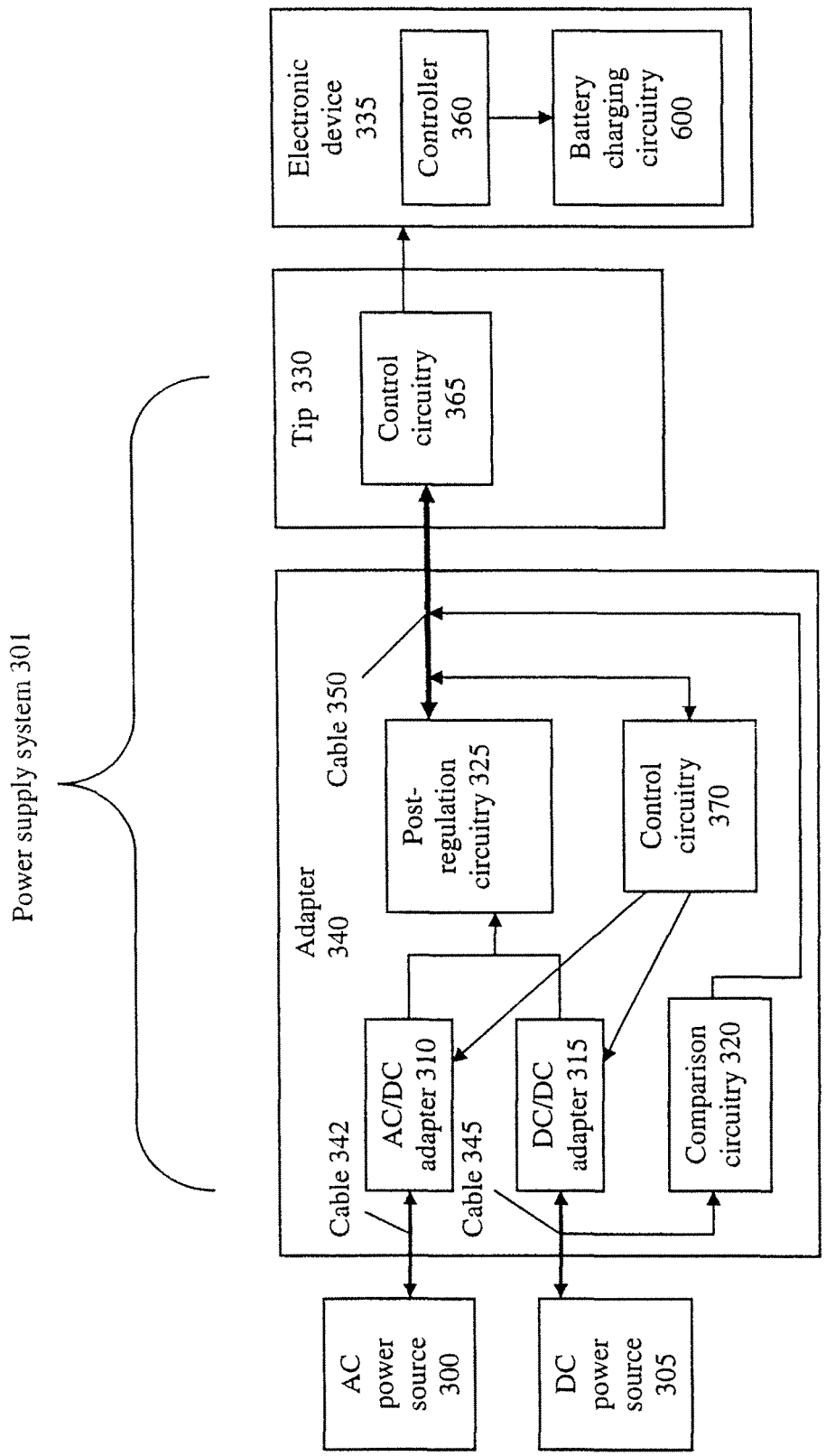
FIG. 3 illustrates a power supply system according to an embodiment of the invention.

FIG. 3 illustrates a power supply system 301 according to an embodiment of the invention. As shown, the adapter 340 may be used with an AC power source 300 or a DC power source 305. In other embodiments, only a DC power source 305 may be utilized to supply power. The AC power source 300 may be coupled to an AC/DC adapter 310 via a cable 342. The DC power source 305 may be coupled to both a DC/DC adapter 315 and comparison circuitry 320 via a cable 345. The DC power source 305 may be an automobile's cigarette lighter outlet or an airplane's EMPOWER system outlet, for example. AC/DC adapter 310 may convert AC power from the AC power source 300 into regulated DC power, which is supplied to post-regulation circuitry 325. The post-regulation circuitry 325 may provide an output voltage (Vout) and a ground reference (GND) to a tip 330 coupled to the adapter 340 via a cable 350, as further explained below with respect to FIGS. 4A and 4B. The tip 330 may be coupled to an electronic device 335 to provide the power thereto from the power supply system 301. The tip 330 may be removable from the cable 350 and may be inserted into a power input opening of the electronic device. Tips 330 may have different shapes and sizes, depending up the shape and sizes of the power input openings of the respective electronic devices 335 being powered. The tip 330 may also include control circuitry 365 to provide a signal to control circuitry 370 of the adapter 340. The signal may be sent to the control circuitry 370 via the cable 350. In one embodiment, the control circuitry 365 of the tip 330 may include digital components to provide a digital signal to the control circuitry 370 of the adapter 340. The digital signal may be utilized to set the magnitude of Vout and limit the amount of current which may be drawn from the adapter 340. The post-regulation circuitry 325 regulates the voltage to what the tip 330 tells it to provide.

Alternatively, the tip 330 may include analog components and may provide voltage programming and current programming voltages ($V_{Vprogram}$ and $V_{Iprogram}$, respectively) to the adapter 340. $V_{Vprogram}$ may be utilized to set the magnitude of Vout. For example, there may be a linear relationship between $V_{Vprogram}$ and Vout where Vout is 3 times as large as $V_{Vprogram}$ program. Accordingly, if $V_{Vprogram}$ had a magnitude of 3.0 Volts, Vout would have a magnitude of 9.0 Volts, and if $V_{Vprogram}$ had a magnitude of 2.0 Volts, Vout would have a magnitude of 6.0 Volts. The analog circuitry may contain passive or active components.

Accordingly, regardless of whether the tip 330 has analog or digital control circuitry, a single adapter 340 may be used to supply power to a plurality of different electronic devices 335 having different power requirements.

The adapter 340 may also include comparison circuitry 320. The comparison circuitry 320 may compare a magnitude of a voltage received from the DC power source 305 with a reference voltage to determine whether the DC power source 305 is an automobile cigarette lighter outlet or an EMPOWER airplane outlet. As stated above, automobile cigarette lighter outlets typically provide a DC voltage having a magnitude within the range of 11.0 Volts and 14.1 Volts. An EMPOWER airplane outlet typically provides a DC voltage having a magnitude within the range of 14.5 and 15.5 Volts. Accordingly, the reference voltage may be set at a level between the high end of the automobile cigarette light outlet voltage (i.e., 14.1 Volts) and the low end of the EMPOWER airplane outlet voltage (i.e., 14.5 Volts). For example, the reference voltage may be set at 14.3 Volts. Accordingly, if the magnitude of the DC power source is greater than 14.3 Volts, then the comparison voltage may determine that the received DC voltage has a greater magnitude than the reference voltage and the DC power source 305 is therefore the EMPOWER airplane outlet. However, if the magnitude of the DC power source is less than 14.3 Volts, then the comparison voltage may determine that the received DC voltage has a smaller magnitude than the reference voltage and the DC power source 305 is therefore the automobile cigarette lighter outlet.

The comparison circuitry 320 may output a signal Vdata based upon whether the DC power source is determined to be the automobile cigarette lighter outlet or the EMPOWER airplane outlet. For example, the comparison may output 5 Volts if the automobile cigarette lighter outlet is detected, and 0.0 Volts if the EMPOWER airplane outlet is detected. In alternative embodiments, different voltages for Vdata may be used. In additional embodiments, the comparison circuitry 320 may output a digital signal, such as a stream of bits, indicative of the DC power source 305. Vdata may be sent via cable 350 to the tip 330, and straight over to the electronic device 335. The electronic device 335 may include a controller 360 which is responsive to Vdata. For example, if the electronic device 335 is a notebook computer and Vdata is indicative of the EMPOWER airplane outlet system, the controller 360 may disable battery charging circuitry 600, thereby preventing recharging of the batteries. And if the Vdata is indicative of the automobile cigarette lighter outlet as the DC power source 305, the controller 360 may enable battery charging circuitry to allow the batteries to be recharged.

Although FIG. 3 illustrates an adapter 340 which includes both a AC/DC adapter and a DC/DC adapter, other embodiments may include only a DC/DC adapter, and no AC/DC adapter.

Figure 4A:
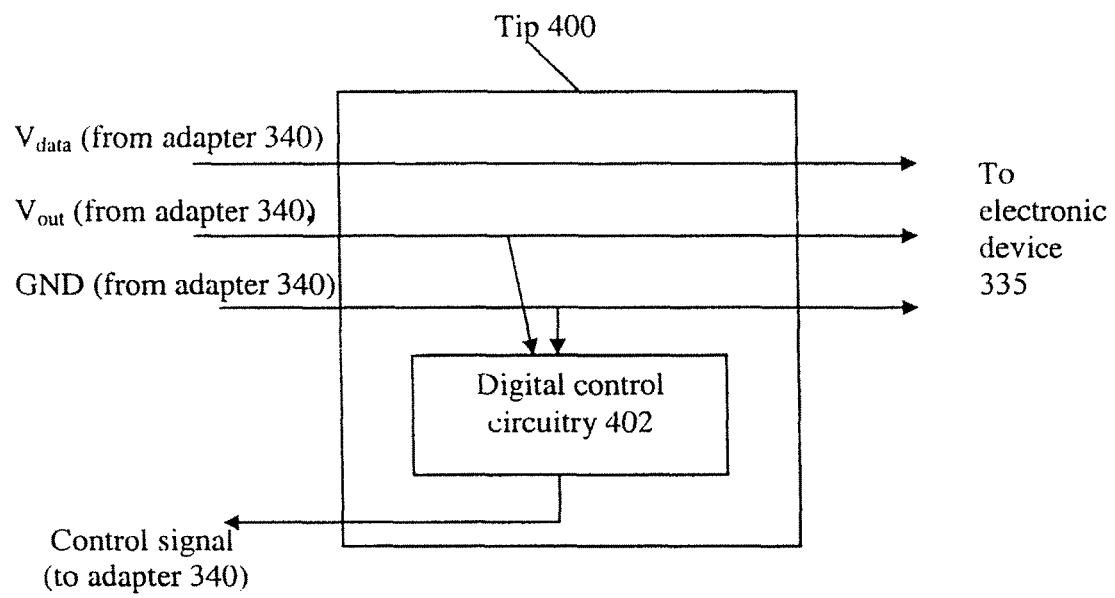
FIG. 4A illustrates a tip having digital control circuitry according to an embodiment of the invention.

FIG. 4A illustrates a tip 400 having digital control circuitry 402 according to an embodiment of the invention. As shown, the tip 400 receives Vdata, Vout and GND from the adapter 340 and allows them to all flow to the electronic device 335. The digital control circuitry 402 may receive the Vout and GND signals and may output a control signal to the adapter 340 to set the magnitude of Vout and limit the current provided. The control signal may be sent to the adapter 340 via the cable 350 between the tip 400 and the adapter 340. The digital control circuitry 402 may include a processor and a memory device, for example. In some embodiments, the tip 400 may be separable from cable 350, and in other embodiments, the tip 400 may be physically part of the cable 350.

Figure 4B:
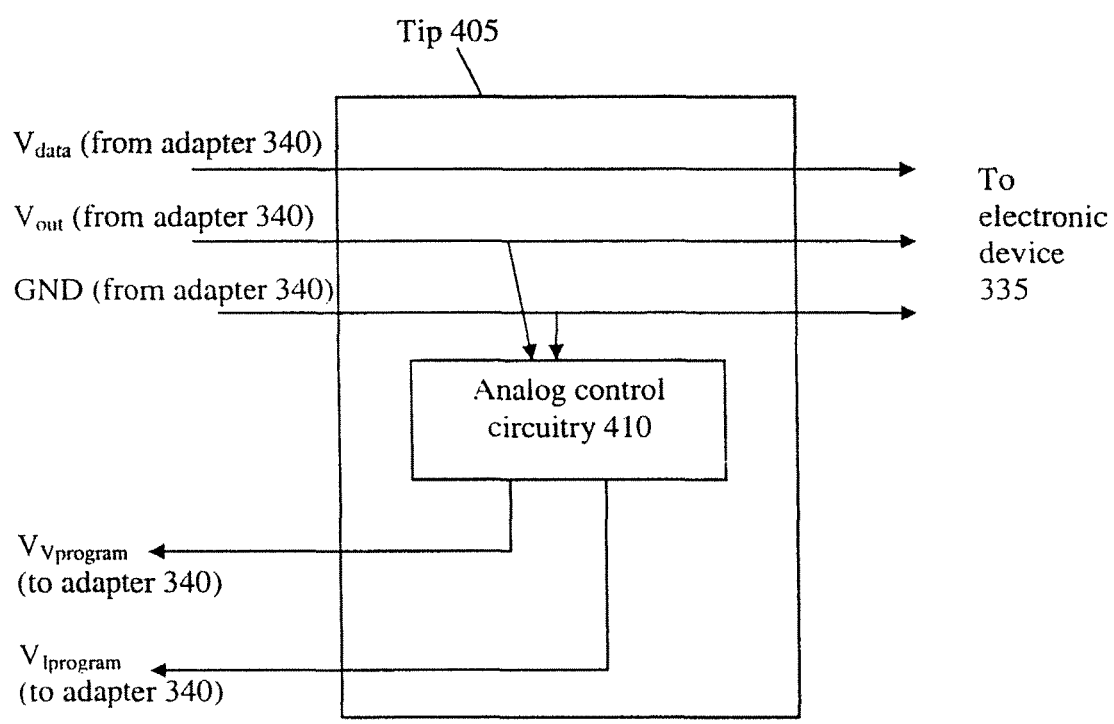
FIG. 4B illustrates a tip having analog control circuitry according to an embodiment of the invention.

FIG. 4B illustrates a tip 405 having analog control circuitry 410 according to an embodiment of the invention. As shown, the tip 405 receives Vdata, Vout and GND from the adapter 340 and allows them to all flow to the electronic device 335. The analog control circuitry 410 may receive the Vout and GND signals and may output $V_{Vprogram}$ and $V_{Iprogram}$ to the adapter 340. $V_{Vprogram}$ and $V_{Iprogram}$ may be sent to the adapter 340 via the cable 350 between the tip 405 and the adapter 340. The analog control circuitry 400 may include passive or active components, for example. In some embodiments, the tip 400 may be separable from cable 350, and in other embodiments, the tip 400 may be physically part of the cable 350.

FIG. 5A illustrates comparison circuitry 320 according to an embodiment of the invention. As shown, the comparison circuitry 320 includes a comparator 500. The comparator 500 receives (a) the DC power signal from the DC power source 305, and (b) a reference voltage, Vref. The comparator outputs Vdata based on whether the magnitude of the DC power from the DC power source exceeds Vref, as described above with respect to FIG. 3.

FIG. 5B illustrates comparison circuitry 320 according to an additional embodiment of the invention. As shown, the comparison circuitry 320 includes a processor 505. The processor 505 receives (a) the DC power signal from the DC power source 305, and (b) value of a reference voltage stored in memory. The processor 505 then outputs Vdata based on whether the magnitude of the DC power from the DC power source exceeds Vref, as described above with respect to FIG. 3. The processor 505 may output a single high or low voltage (e.g., 5.0 Volts or 0.0 Volts) based on the detected DC power source. Alternatively, the processor 505 may output a stream of bits to indicate the DC power source.

Figure 6:
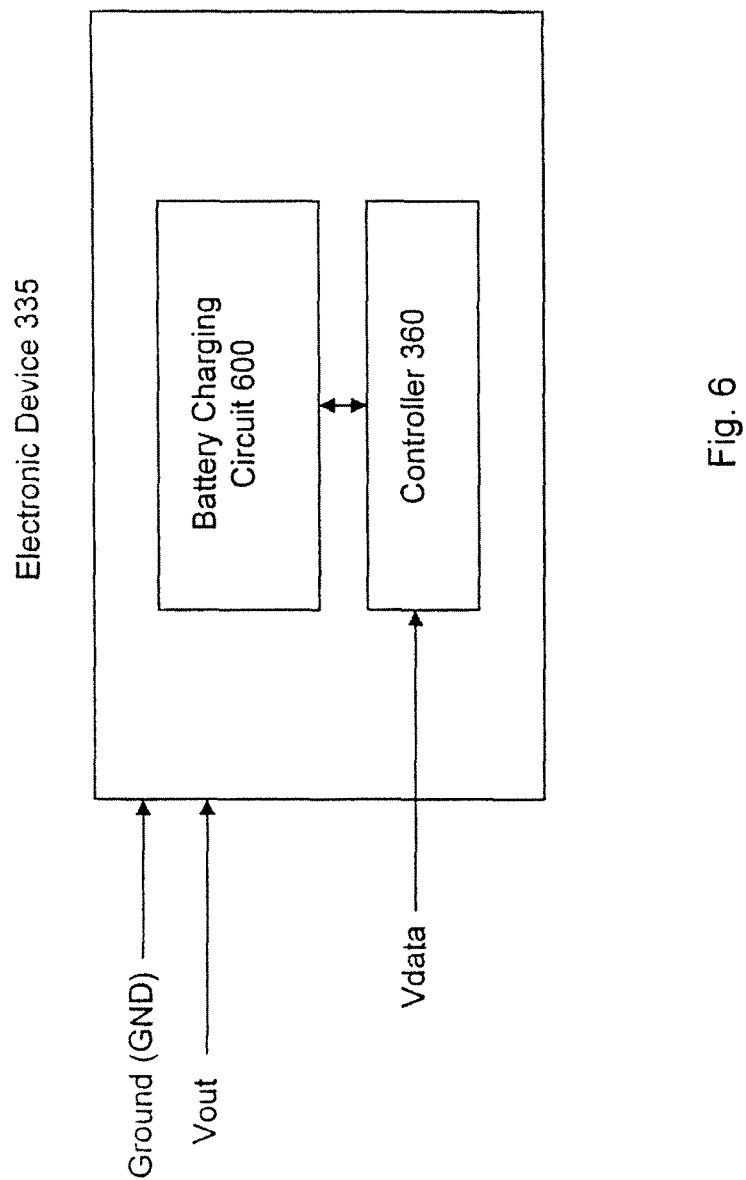
FIG. 6 illustrates an electronic device according to an embodiment of the invention.

FIG. 6 illustrates an electronic device 335 according to an embodiment of the invention. As shown, the electronic device 335 may receive GND, Vout and Vdata from the tip 330. Vdata may be received by a controller 360. The controller 360 may disable battery charging circuitry 600 of the electronic device 335 from charging batteries when Vdata is indicative of the EMPOWER outlet. Alternatively, the controller 360 enables battery charging circuitry 600 so that the batteries of the electronic device may be charged based on the value of Vdata.

FIG. 7A illustrates a method of determining and outputting Vdata according to an embodiment of the invention. The processing shown in FIG. 7A may be implemented by the adapter 340. First, DC power is received 700 from the DC power source 305. Next, the comparison circuitry determines 705 whether the magnitude of the voltage of the DC power received is greater than Vref. If "no," the comparison circuitry determines the DC power source 305 to be an automobile cigarette lighter outlet, and processing proceeds to operation 710, where Vdata is output with a signal/voltage magnitude indicating that the DC power source 305 is the automobile cigarette lighter outlet. Processing then returns to operation 700. If "yes," at operation 705, processing proceeds to operation 715, where Vdata is output with a signal/voltage magnitude indicating that the DC power source 305 is the EMPOWER airplane outlet.

FIG. 7B illustrates a method of receiving Vdata and allowing power to flow to devices within the electronic device 335 based on Vdata according to an embodiment of the invention. First, the electronic device 335 receives 720 the Vdata signal. As discussed above, the Vdata signal is sent from the adapter 340 through the tip 330 and over to the control circuitry 365 of the electronic device 335. Next, based on the Vdata signal, a first set of predetermined devices may be prevented 725 from receiving power. For example, if the electronic device 335 is a notebook computer, the control circuitry 365 may prevent batteries from recharging if Vdata indicates that the DC power source is the EMPOWER airplane outlet. Other devices/components in the electronic device 335 may also be prevented from receiving power or from functioning in a certain way.

At operation 730, a second set of predetermined devices may be allowed to receive power based on the Vdata signal. For example, if Vdata indicates that the DC power source is an automobile cigarette lighter outlet, then power may be available to batteries of the electronic device 335 to allow recharging. Other devices/components in the electronic device 335 may also be allowed to receive power or function in a particular way.

In embodiments described above, the Vdata signal may be used to send a signal to the control circuitry 365 indicating the DC power source. This signaling may be done via a discrete bit, an analog signal, a data signal line, an analog voltage, or via any other suitable manner. The Vdata signal may be transmitted from the adapter 340 to the tip 330 and electronic device 335 via a single signaling line or multiple signaling lines.

Figure 8:
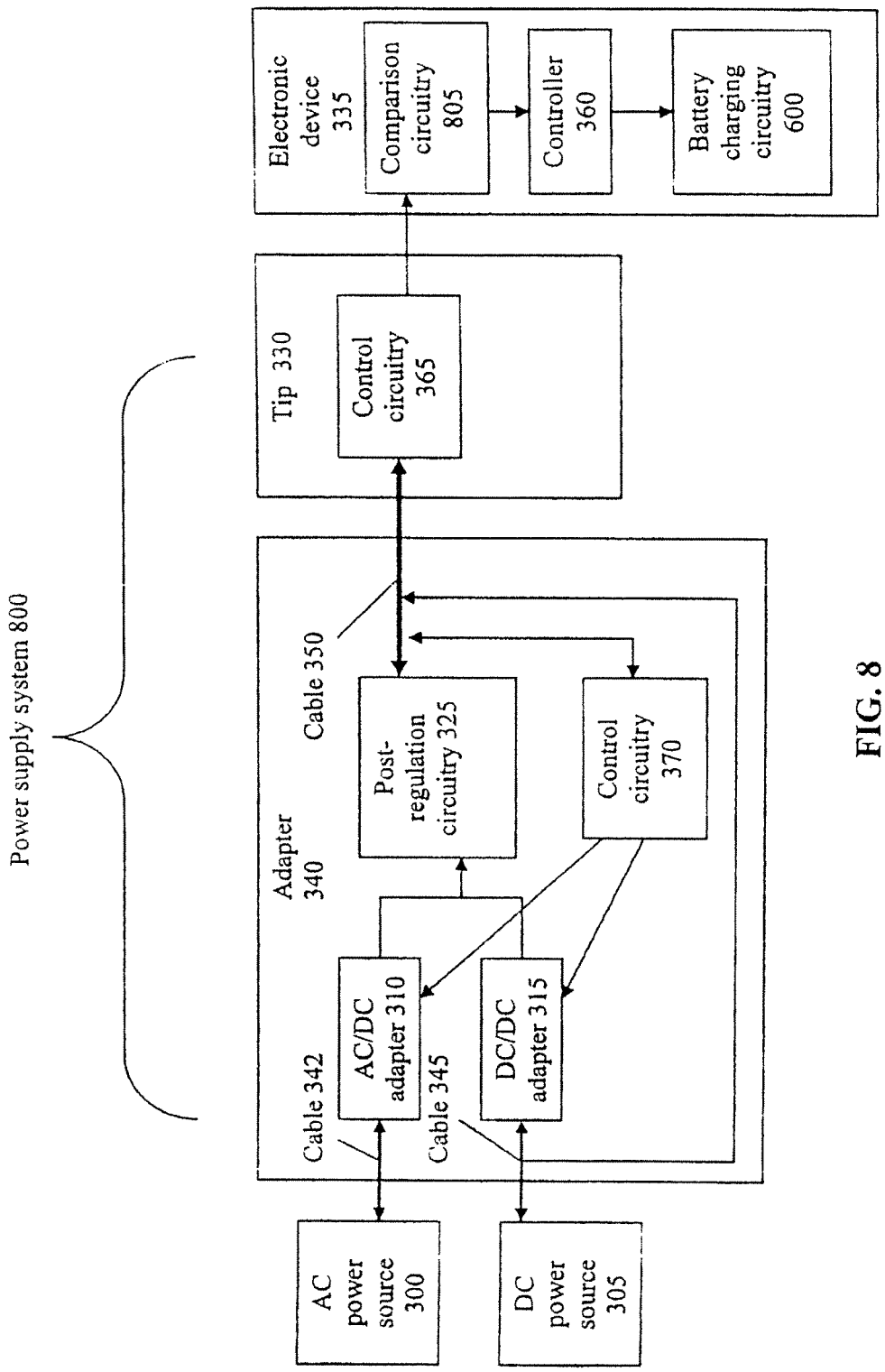
FIG. 8 illustrates a power supply system according to an embodiment of the invention.

FIG. 8 illustrates a power supply system 800 according to an embodiment of the invention. The power supply system 800 is similar to the power supply system 301 shown in FIG. 3. However, unlike the power supply system 301, in which the adapter 340 itself contains comparison circuitry 370, the adapter 340 of power supply system 800 does not contain the comparison circuitry 805. Instead, a regular adapter 340 may be used and the electronic device 335 itself includes the comparison circuitry 805 for determining the DC power source. The electronic device 335 may be a notebook computer and may implement the methods shown in FIGS. 7A and 7B.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. Power supply equipment for powering an electronic device comprising:

an adapter to convert power from a power source, external to the adapter, from AC to DC power or from DC to DC power for powering the electronic device which is external to the power source and the adapter;

a cable having a first end and a second end, the first end being electrically coupled to the adapter to receive the DC power from the adapter;

circuitry having active or passive components to generate a data signal, in the form of an analog voltage, for use by the electronic device to control an amount of power drawn by the electronic device; and a tip which includes:
  an input side which is electrically coupled to the second end of the cable; and
  an output side which is removeably coupleable to the electronic device, the output side having a shape and size dependent on the shape and size of a power input opening of the electronic device,
  wherein the tip provides the DC power and the data signal to the electronic device via conductive lines.

2. The power supply equipment of claim 1, the tip further comprising a single signaling line and a ground reference line, wherein the data signal is transmitted to the electronic device via the single signaling line relative to the ground reference for the DC power.

3. The power supply equipment of claim 1 including a second tip having a second input side which is removeably coupleable to the second end of the cable and having a second output side which is removeably coupleable to the second electronic device, the second output side of the second tip having a shape and size dependent on the shape and size of a power input opening of the second electronic device, wherein the second tip provides the DC power to the second electronic device.

* * * * *